United States Patent
Thomsen

(10) Patent No.: US 8,068,541 B2
(45) Date of Patent: Nov. 29, 2011

(54) SYSTEMS AND METHODS FOR TRANSCODING BIT STREAMS

(76) Inventor: Jan Harding Thomsen, Bagsvaerd (DK)

( * ) Notice: Subject to any disclaimer, the term of this patent is extended or adjusted under 35 U.S.C. 154(b) by 1255 days.

(21) Appl. No.: 11/365,286

(22) Filed: Mar. 1, 2006

(65) Prior Publication Data

US 2007/0177677 A1   Aug. 2, 2007

Related U.S. Application Data

(60) Provisional application No. 60/763,475, filed on Jan. 30, 2006.

(51) Int. Cl.
 *H04B 1/66* (2006.01)
(52) U.S. Cl. .................................. 375/240; 375/240.26
(58) Field of Classification Search .............. 375/240, 375/240.26
See application file for complete search history.

(56) References Cited

U.S. PATENT DOCUMENTS

| | | | |
|---|---|---|---|
| 6,163,508 A * | 12/2000 | Kim et al. ........................ 369/7 |
| 6,167,084 A * | 12/2000 | Wang et al. ............. 375/240.02 |
| 6,192,083 B1 | 2/2001 | Linzer et al. |
| 6,310,915 B1 | 10/2001 | Wells |
| 6,396,910 B1 * | 5/2002 | Lazar et al. ................ 379/93.14 |
| 6,487,171 B1 * | 11/2002 | Honig et al. .................. 370/235 |
| 6,628,712 B1 * | 9/2003 | Le Maguet ............... 375/240.12 |
| 6,643,327 B1 * | 11/2003 | Wang ....................... 375/240.12 |
| 6,674,796 B1 | 1/2004 | Haskell et al. |
| 6,724,825 B1 * | 4/2004 | Nemiroff et al. ........ 375/240.27 |
| 6,748,020 B1 * | 6/2004 | Eifrig et al. ............. 375/240.26 |
| 6,751,404 B1 * | 6/2004 | Whitford et al. .............. 386/241 |
| 6,816,904 B1 * | 11/2004 | Ludwig et al. ................ 709/226 |
| 6,847,656 B1 * | 1/2005 | Wu et al. ....................... 370/477 |
| 6,985,188 B1 * | 1/2006 | Hurst, Jr. ....................... 348/553 |
| 7,039,115 B1 * | 5/2006 | Wu ........................... 375/240.26 |
| 7,103,677 B2 * | 9/2006 | Miller et al. .................. 709/238 |
| 2001/0020954 A1 | 9/2001 | Hull et al. |
| 2001/0038668 A1 * | 11/2001 | Gatepin ................... 375/240.02 |
| 2001/0043792 A1 | 11/2001 | Mishima et al. |
| 2002/0126752 A1 | 9/2002 | Kim |
| 2003/0048854 A1 * | 3/2003 | Kaku ....................... 375/240.29 |
| 2004/0039874 A1 * | 2/2004 | Johnson ........................ 711/105 |
| 2004/0148604 A1 * | 7/2004 | Steffens et al. ............... 718/100 |

(Continued)

FOREIGN PATENT DOCUMENTS

| | | |
|---|---|---|
| WO | WO 00/13419 | 3/2000 |
| WO | WO 01/80571 | 10/2001 |

OTHER PUBLICATIONS

Nakajima, Yasuyuki et al. "Rate Conversion of MPEG Coded Video by Re-Quantization Process." KDD R&D Labs., Visual Communications Group 2-1-15, Ohara, kamifukuoka, Saitama Japan 356. 1995 IEEE. pp. 408-411.

(Continued)

*Primary Examiner* — Juan A Torres
(74) *Attorney, Agent, or Firm* — Merchant & Gould

(57) ABSTRACT

A data processing system including a buffer configured to temporarily maintain a portion of a plurality of compressed data streams and a switch. Each portion of the plurality of compressed data streams comprise one or more units of an encoded media signal. The switch is for providing selective connectivity between the buffer and one or more processors configured to change a property of the data stream. The switch directs one or more units from the buffer to the one or more processors.

28 Claims, 6 Drawing Sheets

U.S. PATENT DOCUMENTS

| | | | |
|---|---|---|---|
| 2005/0041689 A1* | 2/2005 | Wu et al. | 370/477 |
| 2005/0258983 A1* | 11/2005 | Jabri et al. | 341/50 |
| 2006/0020962 A1 | 1/2006 | Stark et al. | |
| 2006/0279628 A1 | 12/2006 | Fleming | |
| 2006/0291560 A1* | 12/2006 | Penna et al. | 375/240.16 |
| 2007/0016671 A1 | 1/2007 | Lee et al. | |
| 2007/0177519 A1 | 8/2007 | Thomsen | |
| 2007/0226739 A1* | 9/2007 | Dodge et al. | 718/102 |

OTHER PUBLICATIONS

Sorial, Hani et al. "Joint Transcoding of Multiple MPEG Video Bitstreams." Centre for Signal Processing and Communications Department of Electrical & Computer Engineering, Concordia University, Montreal, Quebec, Canada. 1999 IEEE. pp. IV-251 to IV-254.

U.S. Office Action dated Nov. 20, 2008 cited in U.S. Appl. No. 11/365,182.

U.S. Final Office Action dated Jun. 24, 2009 cited in U.S. Appl. No. 11/365,182.

U.S. Office Action dated Oct. 30, 2009 cited in U.S. Appl. No. 11/365,182.

U.S. Office Action dated May 27, 2010 cited in U.S. Appl. No. 11/365,182.

International Search Report dated Oct. 18, 2007 cited in Application No. PCT/US2007/061196.

European Communication dated Oct. 21, 2009 cited in Application No. 07756491.2.

U.S. Final Office Action dated Oct. 27, 2010 cited in U.S. Appl. No. 11/365,182.

* cited by examiner

SYSTEMS AND METHODS FOR TRANSCODING BIT STREAMS

CROSS REFERENCE TO RELATED APPLICATIONS

This application claims priority to U.S. Provisional Application entitled, "SYSTEMS AND METHODS FOR TRANSCODING BIT STREAMS", having Ser. No. 60/763,475, filed on Jan. 30, 2006, which is entirely Incorporated by reference.

This application is related to co-vending commonly assigned Non-Provisional Application entitled, "SYSTEMS AND METHODS FOR TRANSOCIDING BIT STREAMS," filed concurrently herewith on Mar. 1, 2006, and accorded Ser. No. 11/365,182 which is entirely incorporated by reference.

TECHNICAL FIELD

The present disclosure is generally related to the processing of bit streams, and more specifically to the transcoding of media bit streams.

BACKGROUND

Digital bit streams can be used for the transmission and distribution of media signals, such as video and audio. The media streams could be, for example, Moving Picture Experts Group streams (i.e. MPEG-1, MPEG-2, MPEG-4 part 2, MPEG-4 part 10 (i.e. H.264)), Windows® Media (VC-1) streams, RealAudio streams, or MPEG Audio Layer-3 (mp3) streams, among others that can be used for the transmission of audio and/or video signals in compressed digital streams. Accordingly, within the context of this disclosure, a multimedia stream (or simply a media stream) could comprise one or more of an audio stream, a video stream, or any other underlying media signals used to convey information (text, graphics, animation, charts, graphs, etc.).

Such multimedia streams may be transmitted over a variety of distribution channels such as computer networks, satellite links, cable television (CATV) lines, radio-frequency signals, and digital subscriber lines (DSL), among others. As a consequence, the multimedia streams can be adapted to a particular distribution channel over which they may be transmitted. For example, the streams could be encoded into a different format (i.e. MPEG-4 to MPEG-2), could be converted from one resolution to another (i.e. 1280×720 pixels to 720×480 pixels), or could be converted from one bit rate to another (i.e. 4 Mbps to 2 Mbps). Such conversions of the multimedia stream, among others, can be collectively referred to as transcoding.

In many cases, conventional transcoders used to process a single bit stream can be made cost effectively and with relatively low implementation issues. However, as the number of media streams being transcoded increase, implementation issues become problematic. This is especially true in terms of the potential memory consumption and sheer number of processors used to perform the decoding and subsequent re-encoding.

Accordingly, in light of these potential deficiencies, among others, it is desirable to provide a transcoder that is scalable to process a large number of multimedia streams while providing the capability to minimize the amount of processing hardware and/or memory.

BRIEF DESCRIPTION OF THE DRAWINGS

The components in the drawings are not necessarily to scale relative to each other. Like reference numerals designate corresponding parts throughout the several views.

DETAILED DESCRIPTION

Systems and methods for transcoding bit streams are disclosed. Embodiments of the systems can be scaleable to process a large number of data streams while conserving memory and minimizing hardware requirements through the time sharing of processing and/or memory elements. An embodiment of the system includes an input buffer for temporarily maintaining a portion of a plurality of compressed data streams, each portion comprising one or more portions of an encoded signal. The system can further include a switch for providing selective connectivity between the input buffer and one or more processors.

For example, according to some embodiments, one or more processors may be configured to analyze the one or more portions of the encoded signal in the input buffer to generate statistical data about the encoded signal that can be used to transcode the bit stream. According to some embodiments, one or more processors may be configured to transcode one or more portions of the encoded signal.

Figure 1:
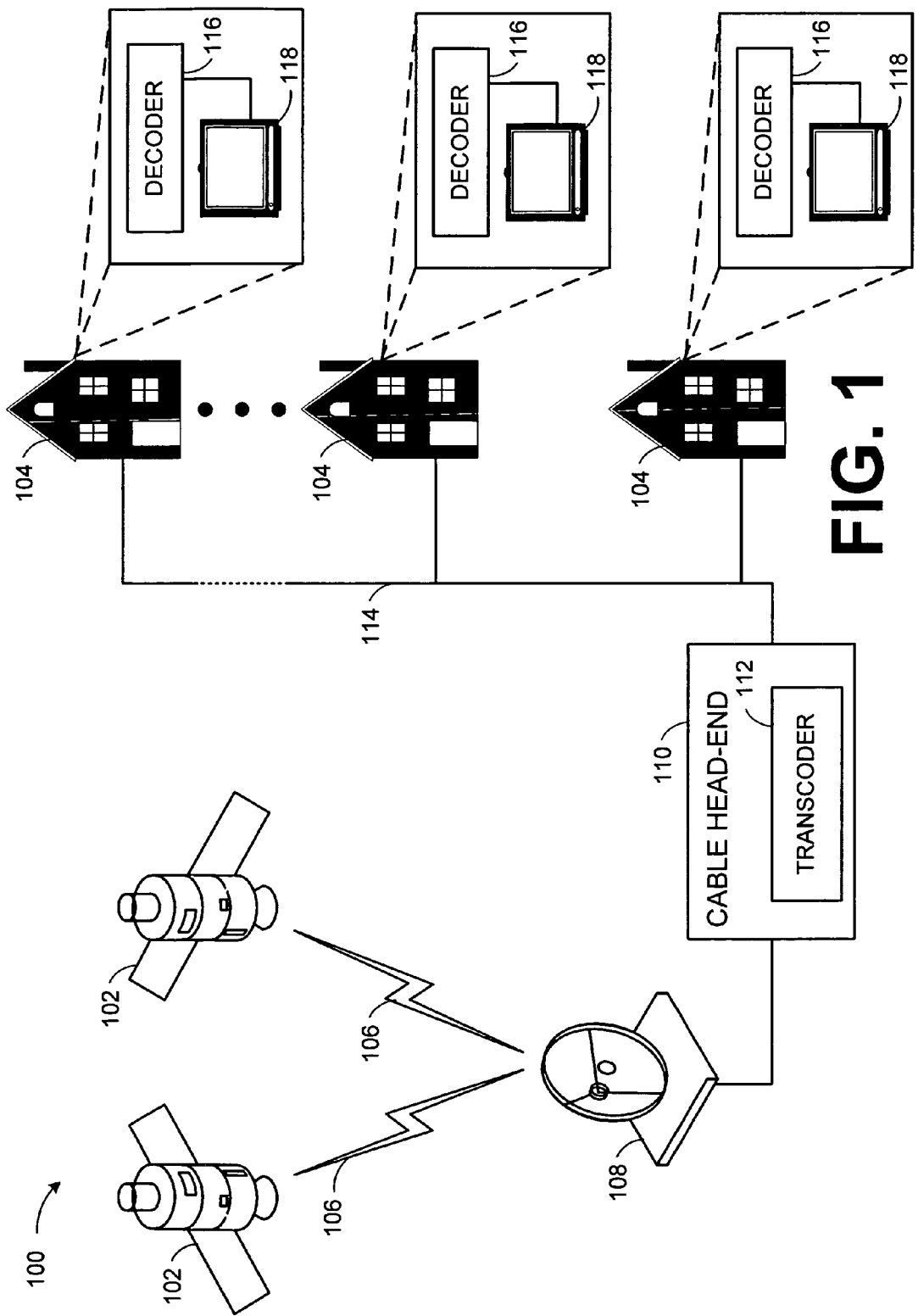
FIG. 1 depicts an embodiment of a cable television distribution network.

Although the described transcoder systems and methods could be used in a number of potential environments, FIG. 1 depicts an embodiment of a cable television distribution network 100 in which embodiments of the transcoders described herein may be used. In general, network 100 relays multimedia signals received from a number of sources, such as satellites 102, to a plurality of remote locations 104. Such multimedia signals could be, for example video and/or audio signals, which could also be transmitted with additional network data, including Internet traffic, teletext, closed-captioning, among others. The remote locations 104 could be residences or businesses that pay for, or otherwise receive, cable television programming. Although reference may be made generally to multimedia signals throughout the detailed description, signals having only one form of media, such as audio or video signals alone, are intended to be well within the scope of the disclosure.

Such multimedia signals and/or data signals may be transmitted over a down-link 106 from satellites 102 to a respective receiver 108 at a cable head-end 110. The signals received at the cable head-end 110 can be multiplexed data streams. Such data streams may comprise compressed multimedia streams transmitted in a variety of formats, such as, but not limited to, MPEG-1, MPEG-2, MPEG-4, VC-1, mp3, and/or RealAudio streams. Such compressed multimedia streams may be transmitted to the cable head-end 110 at a variety of bit rates.

A transcoder 112, located at the cable head-end 110, functions to decode and re-encode the individual media streams for their eventual transmission to remote locations 104. That is, it is sometimes desired to re-encode a previously encoded stream to meet a particular need. Such re-encoding may, for example, be driven by the available bandwidth along connection 114 (i.e. between head-end 110 and remote locations 104), the requirements of the underlying multimedia content, and/or the type of playback device used at the remote location 104.

The re-encoding performed by transcoder 112 may, for example, include altering the bit rate of the multimedia stream. This bit-rate conversion is also known as transrating, and many times (but not always) involves converting the streams received over the downlink 106 into multimedia streams having a lower bit rate. Reducing the bit rate may involve discarding information from the original frequency-domain signal. However, the bit-rate reduction can be performed using known algorithms that mitigate the perceptible differences between the original and transrated streams.

Once the multimedia streams have been transcoded using transcoder 112, the streams can be transmitted over communication connection 114 to one or more decoders 116 at the remote location 104. Communication connection 114 may be, among others, a communications medium such as a coaxial cable, telephone line, or wireless connection. Decoder 116 can, for example, decode and extract the multimedia signals from the transcoded streams for playback on a playback device 118. Playback device could be, for example, a television or audio playback system.

Decoder 116 could be, for example, in a cable television set-top box. According to other embodiments, decoder 116 could be associated with a television, stereo system, or computing device (e.g. personal computer, laptop, personal digital assistant (PDA), etc.). Decoder 116 may receive a plurality of programs on a respective channel, each channel carried by a respective multimedia stream (which can include audio and video signals, among others).

Although the transcoder 112 may be described in certain embodiments as being part of the cable head-end 110, the transcoder could also be used in a number of other locations, such as in decoder 116. For example, according to such an embodiment, decoder 116 may receive a plurality of multimedia streams (e.g. representing one or more channels of audio and/or video content) over connection 114. These streams may be in an inappropriate form for decoder 116 to properly decode and provide to device 118 for playback. Thus, decoder 116 may include a transcoder similar to transcoder 112 to transform the streams into a target format that is usable for decoder 116 or playback device 118. According to yet another example, decoder 116 may be configured to transrate the incoming streams. According to such an embodiment, one or more playback devices 118 may be distributed across a local-area network (LAN) within the remote location 104. The incoming multimedia streams can then be received by decoder 116 and transrated to a bit rate that is compatible with the bandwidth and/or other quality-of-service (QoS) limitations of the LAN associated with the remote location 104. The decoder 116 can then transmit the transrated streams to the desired playback device 118.

Now that a number of potential non-limiting environments have been described within which the disclosed transcoder systems and methods can be used, attention is now directed to various exemplary embodiments of such transcoder systems and methods. It should be understood that any of the methods or processing described herein could be implemented within hardware, software, or any combination thereof. For example, when processing or process steps are implemented in software, it should be noted that such steps to perform the processing can be stored on any computer-readable medium for use by, or in connection with, any computer-related system or method. In the context of this document, a computer-readable medium is an electronic, magnetic, optical, or other physical device or means that can contain or store a computer program for use by, or in connection with, a computer related system or method. The methods can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In some embodiments, where the processing is implemented in hardware, the underlying methods can be implemented with any, or a combination of, the following technologies, which are each well known in the art: (a) discrete logic circuit(s) having logic gates for implementing logic functions upon data signals, an application-specific integrated circuit (ASIC) having appropriate combinational logic gates, (a) programmable gate array(s) (PGA), a field programmable gate array (FPGA), etc; or can be implemented with other technologies now known or later developed.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Figure 2:
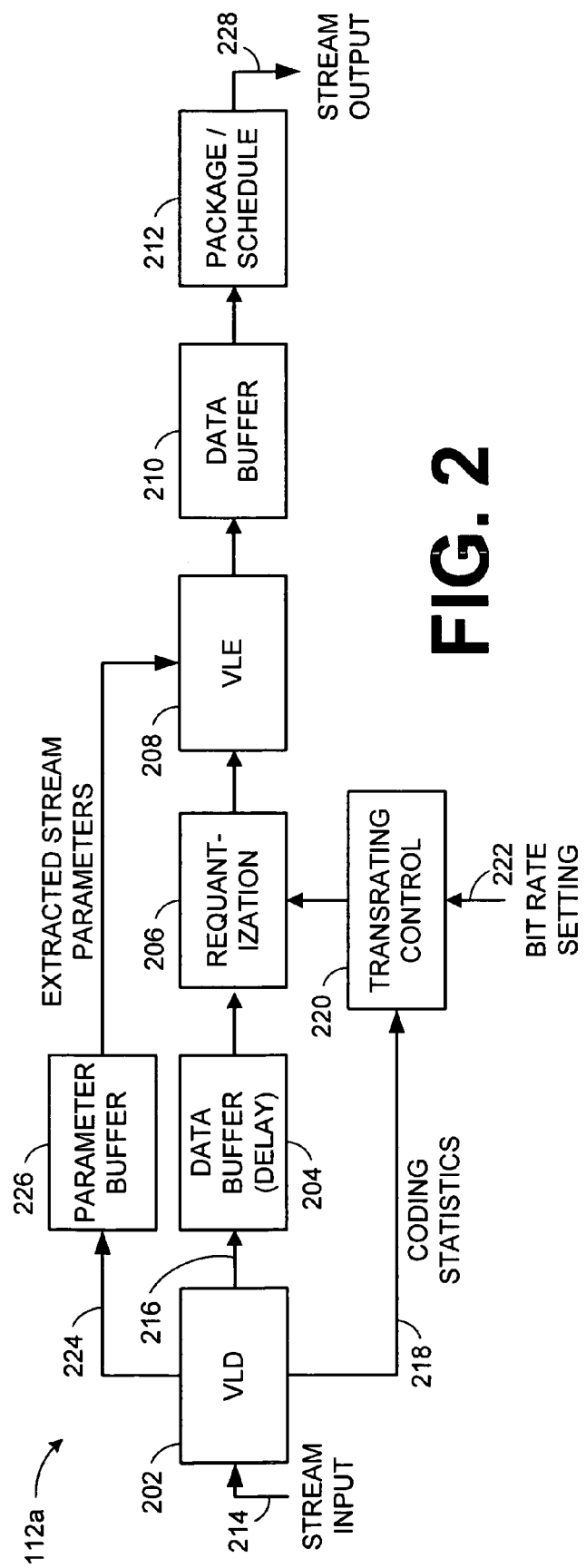
FIG. 2 depicts a schematic diagram of an embodiment of a transcoder that could be used within the cable television distribution network of FIG. 1.

FIG. 2 depicts an embodiment of a transcoder 112a that could be used in the cable head-end (or decoder 116, etc.) of FIG. 1. A transcoder, in its simplest form, comprises a decoder for decoding the first compressed multimedia stream into an intermediate uncompressed format, followed by an encoder for encoding and compressing the audio and/or video from the intermediate uncompressed format to a second compressed format. In some instances this approach may be all that is needed for efficiently transcoding from one format to another (e.g. MPEG-2 to MPEG-4). However, with respect to other operations, such as transrating, this straight-forward approach has drawbacks such as the increased costs, size, and power consumption for implementing a full decoder and encoder. Rather, if only specific characteristics of a multimedia stream are to be changed, without changing the underlying format, it may be possible to change these characteristics without fully decoding and re-encoding the multimedia stream.

Transcoder 112a is described below as performing the function of reducing the bit rate of the video portion of a multimedia stream, without changing the underlying format. For example, the incoming multimedia stream could be an MPEG-2 stream having a video signal encoded at a first bit rate, and the output comprises an MPEG-2 stream having the video signal encoded at a second bit rate.

The conversion of the multimedia stream from one bit rate to another is a transcoding process known as transrating. Said another way, transrating generally involves modifying the multimedia content to alter the underlying encoding bit rate. This modification could be either increasing or decreasing the encoding bit rate. However, because information discarded during transrating can not be recovered, the typical transration that occurs is from a first bit rate to a relatively lower bit rate. However, it should be understood that the rate can be increased using a number of interpolation schemes, for example.

Accordingly, one property of interest associated with a multimedia stream is its bit rate, which can be measured in bits-per-second (bps), for example. In general, assuming all other factors are equal, the encoding of an analog multimedia signal into a digital signal at a high bit rate produces a better quality representation of the original signal than had the analog signal been encoded at relatively lower bit rates.

Although it is generally advantageous to receive a relatively high bit-rate stream, the multimedia stream may need to be transrated into a relatively lower bit-rate stream for a number of reasons. Such factors that may influence the motivation for transrating the bit stream could be, for example, the available bandwidth of the underlying communications channel, the processing power of the underlying components needed to process and/or decode the multimedia stream, and/or the end use requirements of the stream.

Transcoder 112a generally comprises a variable length decoder (VLD) 202, a decoded data buffer 204, a requantization element 206, a variable length encoder (VLE) 208, a re-encoded-data buffer 210, and a packaging and scheduling element 212. A stream may be received at cable-head end 110 in a transport-stream (TS) format. The TS stream may then be unpacked into an elementary stream (ES) and delivered to VLD 202 via stream input 214. Accordingly, VLD 202 decodes the ES into an intermediate data format. Here, this intermediate data format, which may be referred to as frequency domain data 216, is an uncompressed and quantized version of the frequency domain representation of the media (i.e. pictures, sound, etc.). Thus, frequency-domain data 216 can be a frequency domain representation of one or more pictures representing an underlying video signal.

Requantization element 206 analyzes frequency-domain data 216 and reduces the bit rate by selectively removing information based on the analysis. Optionally, VLD 202 may also perform an analysis on the bit stream during the decoding process to produce coding statistics 218 capable of being used by a transrating controller 220 to reduce the bit rate of the multimedia stream with as few human-perceivable defects as possible. That is, transrating controller 220 uses the statistics 218 to control requantization element 206 to produce the desired results.

More specifically, according to an embodiment for transrating a video stream, the controller 220 can determine how many bits to use for each picture in the stream, and how to distribute the available bits across the picture. The coding statistics for the pictures are used in this process to determine how difficult the individual pictures are to code and how important they will be to the overall video sequence. From the statistics, along with an externally provided bit rate setting 222, the bit allocation can be determined. Despite the bit rate reduction, having the coding statistics 218 for a number of pictures into the future assists in providing video quality that is more visually appealing during playback.

The availability of coding statistics 218 for multiple pictures into the future is directly related to the delay between the decoding by VLD 202 and the bit-rate reduction performed by requantization unit 206. Such a delay is provided by decoded-data buffer 204, which holds the decoded, uncompressed frequency domain data 216 for the desired time delay. The delay may be set as low as zero, but low delay generally leads to less visually appealing video quality.

Although statistics 218 are generated by decoding, or partially decoding, the data received at stream input 214, a number of parameters 226 are simply parsed and extracted by VLD 202. After extraction, parameters 226 can be temporarily stored in a parameter buffer 226 until their associated picture is re-encoded by VLE 208.

Once the frequency domain data has been processed by requantization unit 206, the resulting ES is passed to VLE 208 to be re-encoded. VLE 208 may retrieve the parameters 224 from parameter buffer 226 and insert the parameters into the re-encoded bit stream. The re-encoded stream, having the newly reduced bit rate, is then buffered in re-encoded data buffer 210 and re-packaged for delivery by packaging and scheduling element 212. Packaging and scheduling element 212 may, for example, repackage the re-encoded ES into a respective TS at the stream output 228. The resulting lower bit-rate stream, may then be transmitted over the target channel.

Although transcoder 112a is able to efficiently process a relatively low number of concurrent streams of multimedia data, such embodiments may suffer from a number of drawbacks if scaled to process a large number of streams. For example, if many channels are transrated at the same time, the memory requirements for storing the large quantity of decoded, uncompressed multimedia streams become rather large. For example, assuming that an incoming stream has a bit rate of between 3 Mbits/s and 6 Mbits/s, a full frequency domain representation could require as much as 46.7 MB to hold two seconds of data. Such bit rates are representative of those used to transport standard-definition video of a resolution of 720×480 pixels at a 29.97 Hz frame rate. If processing one-thousand video streams, this alone adds up to over 46 GB of memory for buffering the full-frequency data alone. Furthermore, high-definition (HD) video signals having a resolution of 1920×1080 pixels at a 29.97 Hz frame rate corresponds to a bit rate of 12-20 Mbits/s, requiring as much as a 280 MB of buffer per stream to hold two seconds of data.

Additionally, transcoder 112a includes a 1:1 relationship between incoming streams, buffer memory blocks, and transcoding processors. Thus, if one-thousand streams are to be processed, among other redundancies, an equal number of decoded data buffers 204, re-encoded data buffers 210, parameter buffers 226, decoders 202, requantization elements 206, and variable-length encoders 208 are used.

Figure 3:
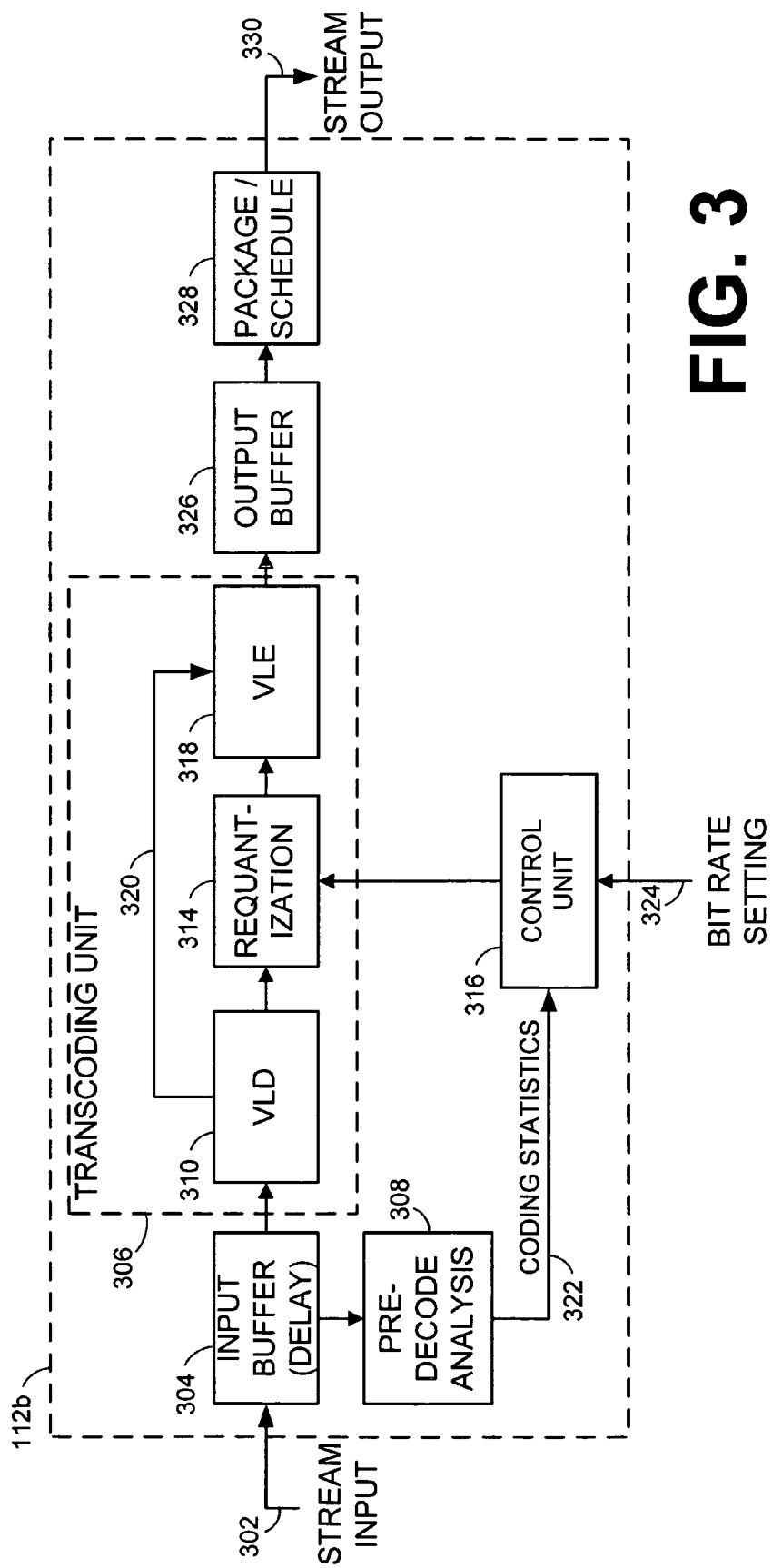
FIG. 3 is a schematic diagram of another embodiment of a transcoder that could be used within the cable television distribution network of FIG. 1.

FIG. 3 depicts another embodiment of a transcoder 112b that could be used in the cable head-end (or decoder 116, etc.) of FIG. 1. However, the configuration of transcoder 112b makes a number of potential improvements with respect to transcoder 112a. As with transcoder 112a of FIG. 2, transcoder 112b is also described in terms of reducing the bit rate of a multimedia stream, without changing the underlying format. Of course, other transcoding operations are intended to be within the scope of the present disclosure. Such operations could include converting the underlying multimedia streams from one format 15 to another (i.e. MPEG-2 to MPEG-4; MPEG-4 to VC-1, etc.). Various analysis and operations may be performed on the underlying multimedia content in the process of decoding and re-encoding. The specifics of this analysis and operations are well within the skill in the art and are outside of the scope of this disclosure.

The cable head-end may receive a stream, such as an MPEG-2 stream. The MPEG-2 stream received at the cable head-end may then be unpacked into an ES. Transcoder 112b accepts the ES in this first format at the stream input 302. According to some embodiments, and as will be described in more detail below, the incoming multimedia stream could comprise a plurality of multiplexed streams. However, for the purposes of clearly describing the basic operation of the transcoder, transcoder 112b is described as processing only a single multimedia stream.

Accordingly, after unpacking the received stream, a portion of the encoded multimedia stream is received and stored within a buffer 304, which stores a desired quantity of the encoded multimedia stream. The buffer provides a delay window, which could represent, for example, a time window (e.g. 0.5 to 2.0 seconds) of multimedia content or a desired number of pictures to be displayed during video playback. Such a delay window, as described above, can be useful for re-encoding portions of the multimedia stream to be played ahead of the buffered pictures.

Unlike the decoded-data buffer 204 of transcoder 112a, the received multimedia stream of transcoder 112b is not stored in input buffer 304 in a decoded, uncompressed format (i.e. as frequency domain data). Rather, the incoming stream of transcoder 112b is retained in input buffer 304 in the same encoded and compressed format as received at stream input 302.

The multimedia stream can be stored within buffer 304 in a logical first-in-first-out (FIFO) format. That is, information can be retrieved from the buffer 304 for processing (e.g. by a transcoding unit 306 and/or a pre-decode analysis module 308) in the same order that the data is stored into buffer 304 from input 302. For the purposes of this disclosure, it is assumed that the frames of the multimedia stream received at stream input are sequenced in the order needed for decoding. The decoding order may not necessarily be same as the playback order. For example, an MPEG-2 decoder may need to obtain information from pictures in the future for playback.

Similar to transcoder 112a, variable length decoder (VLD) 310 of transcoder 112b performs the general function of decoding (or partially decoding) the encoded multimedia stream received from an output of buffer 304. Requantization element 314, which may be under the control of a transcoder control unit 316, receives the intermediate format (i.e. frequency domain data) from VLD 310 and can, if desired, alter its bit rate. Variable length encoder (VLE) 318 then re-encodes the multimedia stream from the intermediate format into the target format. The requantization can also be performed as part of the re-encoding process, but is set forth here separately for the purposes of illustration.

According to some embodiments, VLD 310 may also extract a number of parameters 320 that are embedded into the encoded multimedia bit stream for use in re-encoding the bit stream. For example, these parameters may not be related to particular pictures, but rather are related to the particular stream. As such, they may be re-inserted into the encoded stream by VLE 318 without further analysis of the re-encoded pictures. Such parameters could be, but are not limited to, the resolution of the stream, the decoder buffer size (i.e. Video Buffering Verifier (VBV)), and the sequence type (i.e. chroma format, progressive vs. interlaced, etc.). Parameters 320 may also include those related to a particular picture. These parameters may, for example, include coding options from picture headers, macro-block prediction modes, and/or motion vectors.

The transrating control unit 316 guides the requantization process using statistical data about portions of the encoded multimedia stream stored in input buffer 304. Such statistical data may be referred to herein as coding statistics 322. However, unlike transcoder 112a, the statistical data of transcoder 112b is generated by a pre-decode analysis module 308, which analyzes the encoded multimedia data buffered in buffer 304.

Figure 4:
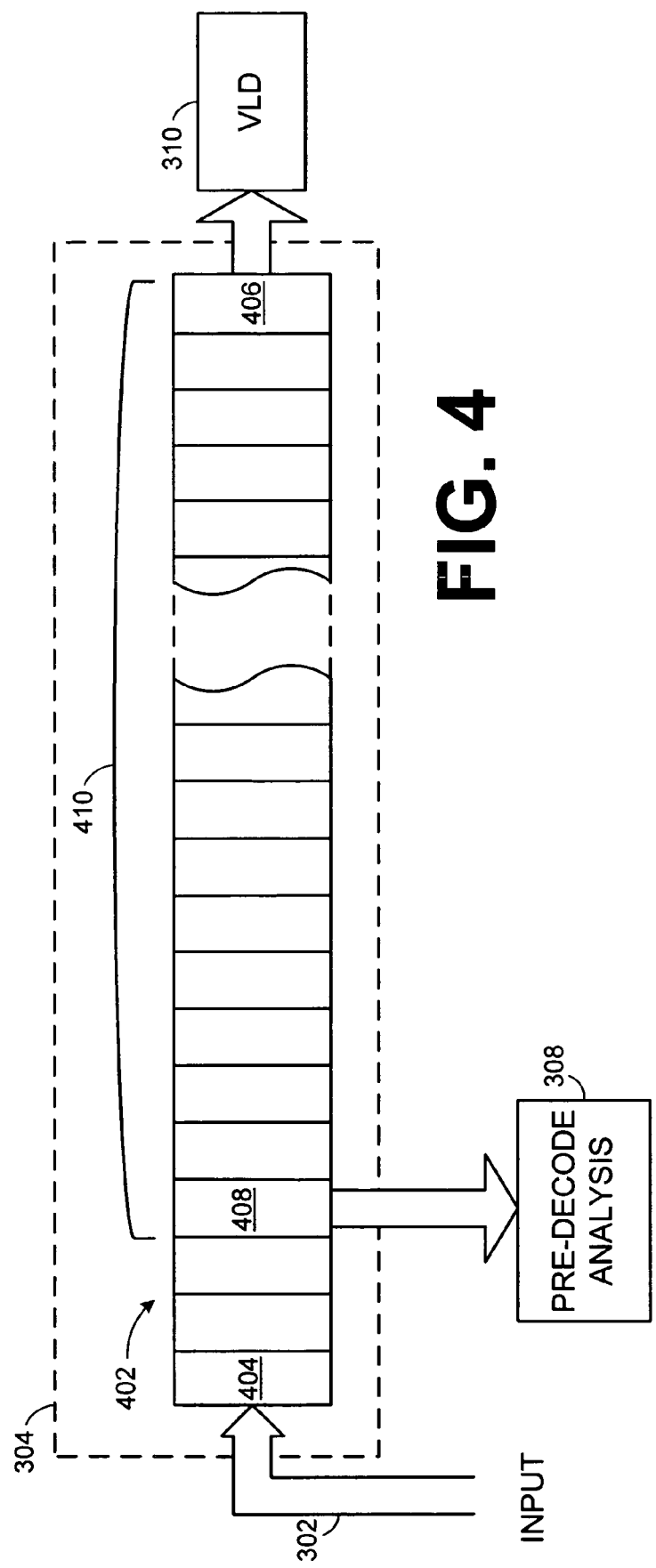
FIG. 4 depicts an embodiment of a FIFO buffer arranged within the input buffer of FIG. 3.

FIG. 4 depicts an embodiment of a FIFO buffer 402 arranged within the physical input buffer 304. Although the memory blocks are depicted in a physical order, in practice, the blocks may not be physically arranged contiguously. Rather, the physical location of the memory blocks may be anywhere within the buffer (i.e. memory), and these blocks may be logically linked to form the FIFO queue. Specific embodiments of memory schemes, such as those using a dynamic memory allocation, are described in later portions of this disclosure.

As data arrives at stream input 302, the data is buffered in the first logical memory location 404. As additional data arrives, the data already received moves sequentially through the buffer until arriving at the last logical memory location 406 in the FIFO queue. The pre-decode analysis module 308 reads the data from the respective address of a memory location in the buffer, here depicted as memory address 408, in order to perform the statistical analysis to generate coding statistics 322. Memory location 408 can be selected to obtain statistical data on a desired amount of buffered video. By reading the data from an address logically closer to the input, more statistical data becomes available. For example, according to the embodiment of FIG. 4, statistical data can be analyzed and made available for the transcoding of multimedia data stored in the memory locations depicted by range 410.

The depicted FIFO buffer 402 is intended to represent a logical visual representation of a FIFO buffer. Thus, it should be understood that, in practice, the data in each block may not be moved from location to location. Rather, pointers and/or tables can be used and updated to determine the beginning, end, and/or internal sequence of the data.

Looking back to FIG. 3, pre-decode analysis module 308 accesses a desired portion of multimedia data in input buffer 308 and can perform one or more desired statistical analyses to produce coding statistics 322. A set of statistical data can be generated for each picture and a list of parameters and associated measurements in the set can be used to aid in the encoding and/or requantization process. For the video of an MPEG-2 multimedia stream, such data may include, but is not limited to, the picture coding type (i.e. I, P or B-picture), the picture size (e.g. number of bits), the number of bits used for coefficients, the number of coefficients, the bits used for special coefficients (dc, low ac, etc.), the quantization level, and/or the number of intra-blocks. It should be understood that the type of coding statistics 322 collected may vary depending on a wide variety of factors. Thus, the above list is not intended to be exhaustive.

Unlike transcoder 112a (FIG. 2), the delay of transcoder 112b is provided by input buffer 304, which temporarily holds a portion of the previously encoded (compressed) stream received at input 302. For video transcoding, this "delay" can correspond to a desired number of pictures desired for the pre-decode.

Providing a large delay could, in principle, provide better transrating results. However, for practical reasons (e.g. memory size, excessive processing requirements, the desire to transmit audio and/or video content in near real-time, etc.) this delay is typically limited. Additionally, the benefits of analyzing frames more than 1-2 seconds behind the frame being transrated begins to diminish quickly after about 1-2 seconds (i.e. 30-60 pictures). The representative amounts of buffered content may vary substantially depending on the coding formats and/or modes. For example, examples used above (1-2 seconds; 30-60 pictures) can be typical for MPEG-2 streams, but it may be beneficial to buffer more pictures when transcoding MPEG-4 video streams.

The pre-decode analysis block 308 may decode, or partially decode, the multimedia stream in order to perform the analysis to obtain coding statistics 322. However, unlike transcoder 112a (FIG. 2), any intermediate representation of the underlying video and/or audio generated by such decoding is buffered for only enough time as needed to perform the pre-decode analysis, and can then be discarded. Only the coding statistics 322 generated by the pre-decode analysis module 308 need be saved. Specifically, the coding statistics 322 may be buffered or otherwise made available to control unit 316 until no longer needed for transcoding the multimedia stream.

Transcoder control unit 316 uses coding statistics 322 to guide the transcoding process. Specifically, according to the present embodiment, control unit 316 uses the coding statistics 322 to control the requantization of the bit stream. The control unit 316 can, for example, use the coding statistics 322 to determine how many bits to use for each picture in the video stream and how to distribute the available bits across the picture. From the coding statistics 322, the bit allocation of the portion being transrated can be determined in order to mitigate any potential defects caused by the discarding of information.

A bit-rate setting 324, which provides the overall bit rate of the re-encoded multimedia signal, can be provided externally as a restriction on one or more channels. According to some embodiments, the bit-rate setting defines that a particular set of channels stay within a predefined aggregate bit rate represented by the setting. In this case, control unit 316 can take coding statistics 322 for all channels in the set into account, and the available bits are distributed to the pictures in the set of channels in such a manner that the picture quality is perceived to be substantially even across the channels. One advantage of such a multi-channel bit-rate restriction is that channels with "difficult" content may borrow a portion of the bit-rate allocation from those channels with relatively easy content. Accordingly, an overall improvement in picture quality can be obtained across the set of channels.

The design of transcoder 112b makes available the coding statistics 322 for a number of pictures into the future (those stored within buffer 304) to provide information capable of being used to maximizing the perceived quality of the re-encoded multimedia stream. Additionally, by performing the pre-decode analysis without storing the decompressed intermediate representation of the multimedia stream, the transcoder can advantageously require less memory than transcoder 112a.

Such memory savings may vary greatly, especially depending on the compression ratio of the encoded signal and its intermediate representation. Assuming that an incoming multimedia stream, such as an MPEG-2 stream, has a bit rate of between 3 Mbps and 6 Mbps (and a resolution of 720×480 pixels at a 29.97 Hz frame rate), a full frequency domain representation of the stream (e.g. the intermediate representation produced by VLD 310) could require as much as 46.7 MB to hold two seconds of the multimedia stream. Without considering implementation factors (which would increase memory requirements), this alone adds up to over 47 GB of memory for buffering the full-frequency data if processing one-thousand video streams.

However, if only encoded data is buffered, as with transcoder 112b, again assuming an input stream of between 3 Mb/s and 6 Mb/s (and a resolution of 720×480 pixels at a 29.97 Hz frame rate), a two second delay requires up to 12 Mbits (~1.5 MB) of required space. If scaled to process one-thousand video streams, this translates to only 1.5 GB of memory, reflecting a significant memory savings over transcoder 112a.

The exemplary 3-6 Mbps rate used above is representative of the range of bit rates commonly used for standard-definition video. However, these figures drastically increase for high-definition television (HDTV) video. Accordingly, with increasing broadcasts of multimedia programming in HDTV, memory usage during the transcoding of such bit streams has become a serious implementation issue in conventional transcoders. It should also be understood that the bit rates used above are also only representative numbers and, in practice, can vary substantially.

Once the transrated multimedia stream has been re-encoded by VLE 318, the re-encoded stream is temporarily buffered in output buffer 326, which may also comprise a logical FIFO buffer (not depicted) similar to the FIFO buffer 402, described previously. Packaging and scheduling module 328 can package the re-encoded multimedia bit stream for transmission and schedules the units of data for delivery to the remote locations 104 from stream output 330.

The potential memory advantages highlighted above are at the expense of additional processing power to perform the pre-decode analysis. However, as will be described with respect to several embodiments disclosed below, this apparent consequence can be mitigated substantially.

Although transcoder 112b is described as having the capability to transcode a single channel, some benefits of the device may not be fully appreciated until scaled to concurrently process a large quantity of channels at the same time. As mentioned, the memory requirements of transcoder 112a of FIG. 2 can soon become relatively large. In addition, a 1:1 relationship between processing units and buffers also greatly diminish the attractiveness of such a decoder when scaled to process a relatively large number of streams.

Figure 5:
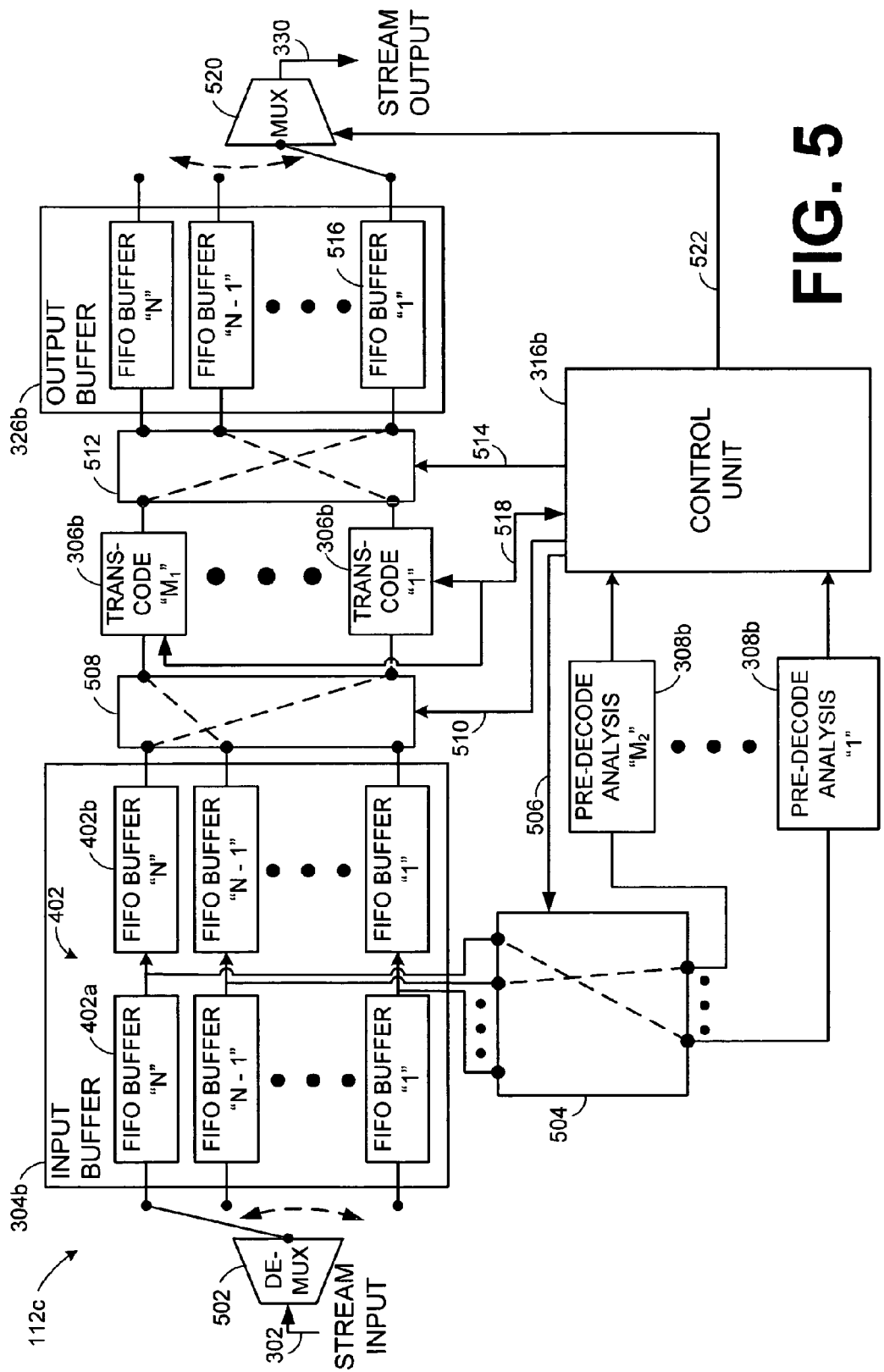
FIG. 5 is a schematic diagram of another embodiment of a transcoder that could be used within the cable television distribution network of FIG. 1.

Accordingly, looking to FIG. 5, a multi-channel transcoder 112c (based on the principles of transcoder 112b of FIG. 3) is disclosed that can be configured to process multiple streams by advantageously timesharing hardware components to reduce the number of processing components and while further mitigating memory usage.

For example, in many embodiments, the processing steps of pre-decode analysis, decoding, requantization, and encoding can be performed with processing components powerful enough to process more than one channel at a time. It should be understood that the range of performance of the particular processing component may vary depending on, for example, how the algorithms are executed. For example, these processing steps are executed by specific-purpose hardware, such as an FPGA or an ASIC, the performance can be highly leveraged to concurrently process a large number of multimedia streams, while general purpose processors executing software designed to perform the designated processing steps may be capable of concurrently processing less streams.

However, it should be understood that although the embodiments described herein may be described in terms of reducing processing elements, some embodiments may use a greater number of processing elements than the number of streams being concurrently processed. For example, such an implementation could advantageously allow for the processing of streams having extremely large bit rates in a timely manner. The important aspect is that embodiments of the disclosed transrator can change the ratio of processing elements from 1:1 to some other ratio being greater or less, depending on the environment.

Like transcoder 112b of FIG. 3, operation of transcoder 112c is described with respect to the transcoding of an MPEG video bit stream, and more specifically, to the transrating of the incoming MPEG-encoded video stream. The transcoder 112*c* of FIG. 5 shares many of the same principles and components of transcoder 112*b* of FIG. 3. However the important additional aspects and/or differences are highlighted below.

Stream input 302 comprises a stream of N multiplexed multimedia bit streams. De-multiplexer (DMUX) 502 receives and de-multiplexes the streams into N multimedia streams. The N streams can be provided to respective logical FIFO buffers 402 for providing a desired delay. Transcoder 112*c* can include $M_1$ transcoder units 306*b* to transcode the N input multimedia streams. The transcoder units 306*b* could, for example, generally comprise the VLD 310 and VLE 318 of FIG. 3 and/or any other components needed to perform a desired transcoding of the N input streams into N target multimedia streams. In the case of transrating the N input streams, the $M_1$, transcoder units could also comprise requantization element 314 of FIG. 3. According to some embodiments, transcoding units 306*b* may even be configured differently to perform different kinds of transcoding processes.

Similarly, according to some embodiments, transcoder 112*c* can include $M_2$ pre-decode analysis units that can be timeshared to analyze the N streams of multimedia data buffered in input data buffer 304*b* (i.e. to provide coding statistics to trancoding control unit 316*b*).

As with transcoder 112*b* of FIG. 3, pre-decode analysis module 308 reads the data from the respective address of a memory location in one of the N logical FIFO buffers 402 in order to perform the statistical analysis. As with FIFO buffer 402 of FIG. 4, the specific relative memory location (i.e. block 408) from which to read from can be selected to obtain statistical data on a desired amount of the buffered multimedia content in the FIFO buffers 402.

However, unlike transcoder 112*b* of FIG. 3, the FIFO buffers 402 can be connected to the pre-decode analysis units through a switch 504, which could be a cross-point switch. Switch 504 can be configured such that any of the pre-decode analysis units 308*b* can be connected to any of the FIFO buffers 402 under the control of transcode control unit 316*b*. Accordingly, cross-point switch 504 may be configured with N inputs, connected to each of the N FIFO buffers 402. Likewise, switch 504 may be configured with $M_2$ outputs, connected to each of the $M_2$ pre-decode analysis units. Switch 504 may further include an input for receiving control signals from control unit 316*b* across control line 506. Such control signals specify to the switch 504 which of the N inputs and $M_2$ outputs should be connected at a given time.

Depending on the type of analysis being performed on the buffered multimedia streams, the time required for analyzing each portion of the stream may vary. For example, in the case of video streams, more complex pictures or types of frames may require a longer analysis time than less complex pictures. Thus, tying a specific processing unit to process only the streams of a particular channel (e.g. by tying each FIFO buffer 402 to a specific pre-decode analysis unit 308*b*) can potentially cause a loss in performance. That is, if the processing units are assigned to a particular FIFO buffer, the pre-decode analysis units 308*b* may sit idle for periods of time when they could otherwise be used to process data from other FIFO buffers.

Accordingly, the pre-decode analysis units 308*b* can be thought of as a common pool of processing resources, and the switch 504 can be controlled to direct portions of the multimedia stream stored in any of the multimedia N FIFO buffers 402 to any of the pre-decode analysis units 308*b* at a time when a respective processing unit is able to process additional data.

The time-shared pre-processing can be performed on a predetermined portion (i.e. a unit) of the multimedia stream. That is, each pre-decode analysis unit 308*b* can be configured to process one or more units of the multimedia stream before moving on to another unit of the same or different channel. In the case of video streams, for example, the units may comprise the pictures of the video stream, and processing may be performed on a picture-by-picture basis. Thus, one picture can be analyzed by a pre-decoder unit 308*b* in its entirety, before the processing is performed on a picture from the same or different channel. The units may vary considerably from one multimedia format to another. For example, MPEG-2 transcoding may use a slice, which corresponds to a subdivision of an individual picture. Such a slice could correspond to a row of macroblocks. According to other embodiments, the unit could include multiple pictures. Similarly, when transcoding audio, the units may correspond to audio frames, or some other audio sampling period.

According some embodiments, the $M_1$ transcode modules 306*b* can be timeshared among the N FIFO buffers 402 in a similar manner as the pre-decode analysis modules 308*b*. Thus, a switch 508, can be configured to connect any of the $M_1$ transcode units 306*b* to any of the N FIFO buffers 402 under the selective control of transcode control unit 316*b*. Accordingly, switch 508 could be a cross-point switch and can be configured with N inputs that are connected to each of the N FIFO buffers 402. Likewise, switch 508 may be configured with $M_1$ outputs, connected to each of the $M_1$ transcode modules 306*b*. Switch 508 may further include an input for receiving control signals from control unit 316*b* across control line 510. Such control signals specify to the switch 508 which of the N inputs to connect to the $M_1$ outputs.

Further, a switch 512 can be configured to connect transcode units 306*b* to any of the output FIFO buffers 516 under the selective control of transcode control unit 316*b*. Accordingly, cross-point switch 512 may be a cross-point switch configured with $M_1$ inputs that are connected to each of the outputs of the $M_1$ transcoder modules 306*b* and also configured with N outputs connected to each of N output FIFO buffers 516. Switch 512 may further include an input for receiving control signals from control unit 316*b* across control line 514. Such control signals specify to the switch 512 which of the $M_1$ inputs to connect to the N outputs.

Accordingly, under the direction of control unit 316*b*, each of the multimedia streams transcoded by transcoder modules 306*b* can be buffered in the N output buffers 516. A multiplexer (MUX) 520 can be configured to selectively retrieve portions of the transcoded multimedia stream from the N output buffers 516. MUX 520, or a package and scheduling module 328 (FIG. 3), may be configured to package and schedule the units of data comprising the multimedia stream for delivery to the remote locations 104. Such selective retrieval, packaging, and/or scheduling may be under the control of control unit 316*b* via control lines 522.

Transcoding control unit 316*b* performs a number of tasks, including scheduling the pictures that are delivered to pre-decode analysis modules 308*b* and/or transcode units 306*b*. Control unit 316*b* determines which pictures are delivered to a particular processing unit at any particular time. To do so, control unit 316*b* can send control signals over respective control lines 506 and/or 510 to configure the input and output connections of the respective pre-decode analysis modules 308*b* and/or transcode units 306*b*.

The criteria used in determining the scheduling order may depend on a number of factors. For example, one such factor is to ensure that the pictures are available to the respective decoder in due time for the decoder to be able to present the pictures according to the fixed frame rate. In video coding this is often referred to as obeying the decoder buffer model. For MPEG-2, this scheduling adheres to the video-buffer verifier (VBV) model.

In addition to determining from which FIFO buffer 402 to obtain the next portion of the stream, control unit 316*b* also determines which of the pre-decode analysis modules 308*b* and/or transcode units 306*b* are to receive the next portion of the encoded bit stream from the selected FIFO buffer 402. For example, the pre-decode analysis units 308*b* may be scheduled on an availability basis, as new pictures to be analyzed become available at the selected position in buffer 402. This position may be, for example, block 408 of FIG. 4.

Although embodiments described above refer to each FIFO buffer 402 being a single logical buffer, some embodiments may split each of the FIFO buffers 402 into multiple daisy-chained FIFO buffers. For example, each FIFO buffer 402 could be split into two logical or physical FIFO buffers 402*a* and 402*b*, as depicted in FIG. 5. The exit point of FIFO buffer 402*a* can form the selected position from which a pre-decode analysis module 308*b* retrieves its next unit of work, while the exit point of the second buffer right FIFO buffer 402*b* can feed a respective transcode unit 306*b*.

Control unit 316*b* may select any free pre-decode analysis modules 308*b* and/or transcode units 306*b* to process a particular portion of the stream. Once the portion of the multimedia stream has been transferred to a pre-decode analysis module 308*b* and/or transcode unit 306*b*, the control unit may also be configured to send a signal to the start the processing.

Upon finishing its respective processing, the pre-decode analysis modules 308*b* and/or transcode units 306*b* can be configured to send a completion signal to control unit 316*b* indicating that the processing results can be retrieved and that the respective predecode analysis module 308*b* and/or transcode unit 306*b* is now available for a new portion of the bit stream to process.

Thus, upon receiving such a completion signal from pre-decode analysis module 308*b*, control unit 316*b* may retrieve the resulting coding statistics related to the portion of the stream analyzed. Likewise, upon receiving such a completion signal from transcode unit 306*b*, control unit 316*b* may direct switch 512 to connect the appropriate output of transcode unit 306*b* to the appropriate input of a respective FIFO buffer 516. The transrated and re-encoded signal may then be delivered and stored in this FIFO buffer 516.

In the case that pictures of multiple channels are ready to be processed at the same time, the situation may occur that no free processing resource (pre-decode analysis module 308*b* and/or transcode unit 306*b*) is available. In such a case, the control unit 316*b* can wait for until such resource becomes available. However, a sufficiently large input buffer 304*b* can make up for such situations. Likewise, on the output of transcode unit 306*b*, output buffer 326*b* can be used to compensate for such delays, including the variable time-shift that is inherent when implementing a time-sharing principle.

If the processing units are not able to sustain the required rate over a time period compensated by the buffers 304*b* and/or 326*b*, an input buffer overflow and/or an output buffer underflow occurs, and may be handled in a number of ways (i.e. skipping the processing of a particular units, etc.). Such a situation indicates an overall overload of the system.

Control unit 316*b* can be configured to collect the pre-decode data from the pre-decode analysis units. In the case of video, control unit 316*b* may then use these statistics to determine the settings for the transrating and/or transcoding of the individual pictures. Accordingly, control unit 316*b* may have an associated memory (not depicted) to temporarily store the statistical data until no longer needed. Accordingly, control lines 518 between each of the M1 transcoder elements 306*b* and control unit 316*b* may be used to communicate any such settings from the controller 316*b* to a respective VLD, VLE, and/or requantization unit associated with a transcode module 306*b*.

Although the embodiments can be scaled to a variety of sizes, one such embodiment could timeshare five transcode modules 306*b* among five-hundred multimedia streams. A similar number of pre-decode analysis modules could be timeshared among the same number of multimedia streams. Such a configuration incorporating the time sharing of either, or both of, transcode modules 306*b* and/or pre-decode analysis modules 308*b* can significantly reduce the amount of hardware needed to implement a multi-stream transcoder.

It should be understood that is not necessary that there be equivalent numbers of pre-decode analysis units and transcoder units, as these processors are independent of each other and perform different tasks.

For the purposes of more clearly describing the timesharing aspects of the transcode units 306*b* and pre-decode analysis units 308*b*, the specific implementation of input memory FIFO buffers 402*b* and output memory FIFO buffers 516 have been generally depicted as being fixed-size logical or physical buffers.

Although this approach is possible, in practice, such a configuration can become impractical (or grossly inefficient) as the number of streams to be processed increases. For example, the bit rate of the streams can vary widely from channel to channel, particularly for different types of content. Accordingly, if the size of the FIFO buffers are fixed, the size is of the buffers is necessarily determined based on the highest possible bit rate. Accordingly, this approach can result in large amount of unused memory under normal operating conditions.

Thus, the transcoder embodiments disclosed herein can implement a dynamic-memory allocation scheme in which the size of the FIFO buffers can be dynamically allocated on an as-needed basis. According to such an embodiment, buffers 304*b* and 326*b* can be implemented as one or more physical memory blocks. However, the FIFO buffers 402*b* and 516 can be implemented as logical units (instead of physical units) that reside in the physical memory.

Figure 6:
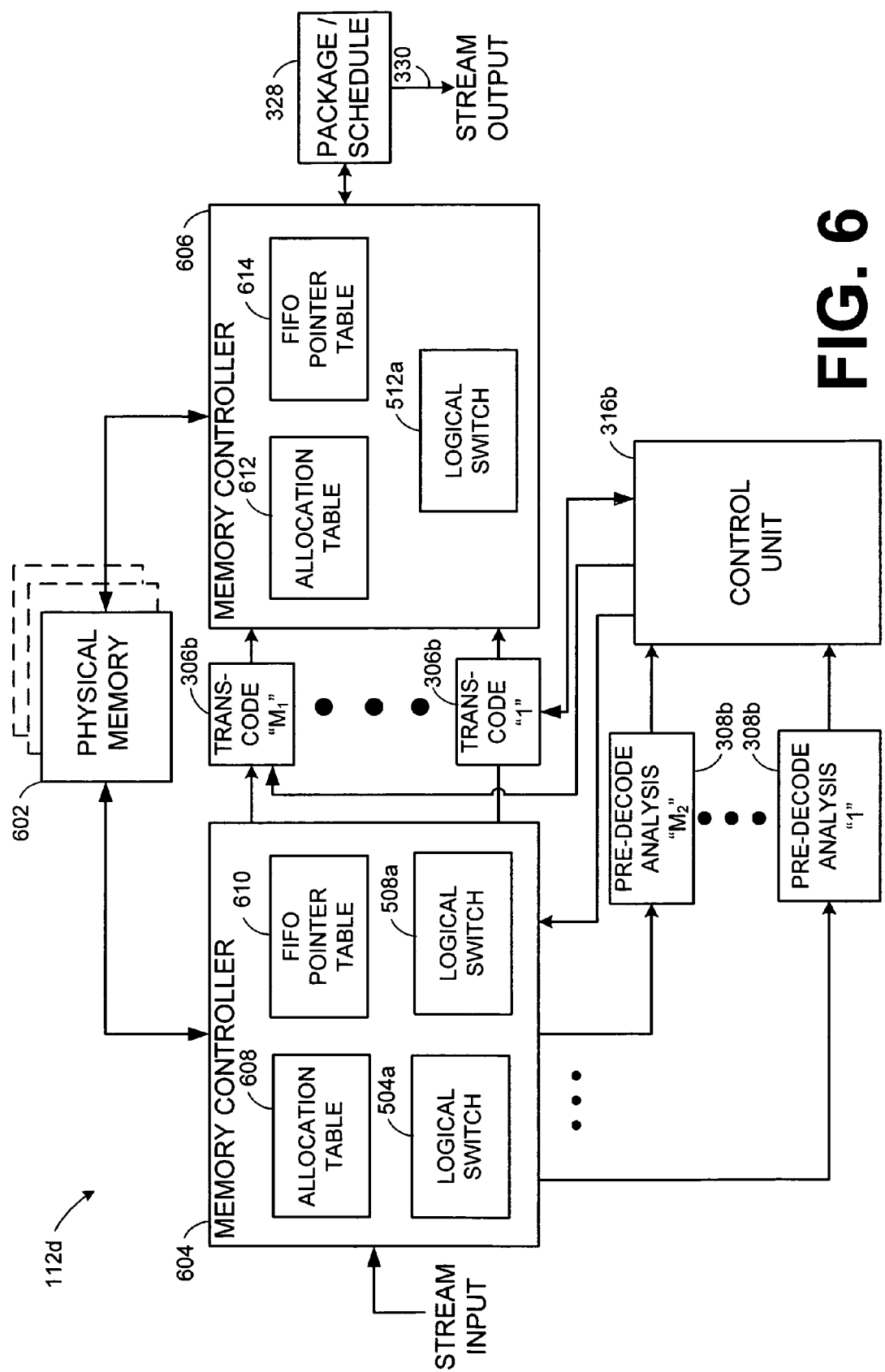
FIG. 6 is a schematic diagram of an embodiment of the transcoder of FIG. 5 implemented with logical FIFO buffers and/or logical switches.

FIG. 6 depicts an embodiment of a transcoder 112*d*, based on the principles of transcoder 112*c* of FIG. 5. Transcoder 112*d* may include memory controllers 604 and 606 which can function to dynamically allocate memory to the FIFO buffers as well as function as logical switches.

Specifically, according to some embodiments, transcoder 112*d* can dynamically allocate the memory used by the FIFO buffers 402*b* and 516 of FIG. 5. According to such an embodiment, one or more physical memory modules 602 represent the physical storage devices for the input data buffer 304*b* and 326*b* of FIG. 5. Further, an input buffer memory controller 604 and an output buffer memory controller 606 can be configured to control and maintain the dynamic allocation of the memory. Controllers 604 and 606 can also be configured to function as a logical switch between the FIFO buffers and the transcoder units 306*b* and/or pre-decode analysis units 308*b*.

With respect to the dynamic memory allocation, memory controller 604 may maintain the memory allocated to each FIFO buffer in an allocation table 608. According to some embodiments, the allocation table 608 may maintain a list comprising an entry for each memory segment, which is the smallest amount of memory used for allocation. Upon request from a FIFO buffer 402*b* or 516, memory controller 604 can allocate a free memory segment. The allocation table holds a "next pointer" for each segment, which points to the next segment to create a linked list. The last segment in the list has a NULL pointer, indicating that no segment follows. This list defines the memory for a logical FIFO, and such a list can be traced in the allocation table for every logical FIFO.

A FIFO pointer table 610 may also maintain memory address information about each of the FIFO buffers 402b and/or 516. According to some embodiments, FIFO pointer table 610 contains a write pointer and a read pointer for each FIFO buffer. The write pointer points to the segment, and the location in the segment, where the next data is to be written. When data has been written, the write pointer is updated to point to the next position. When the last memory cell of the segment is used, a new segment is allocated and the allocation table for the last segment in the list is updated to point to the new segment, which then becomes last (pointing to NULL). The write pointer is updated to point to the first element of the new segment.

Likewise, the read pointer points to the segment and the position within the segment of the first unread element in the FIFO buffer, and the read pointer is updated whenever data is read from the segment. When the last data in a segment is read, the read pointer is updated using the "next pointer" from the allocation table to point to the next segment in the list. The previous segment is no longer used and is returned to the end of a list of the free segments.

A free list, which comprises a linked list of free segments in the allocation table, is also maintained. When segments are allocated they are taken from the top of the free list. A pointer defines the start of the list, by pointing to the first free segment, and another pointer points to the last element. The latter is used for returning segments to the free list.

In the case that each FIFO buffer 402 is a single logical buffer used to feed both pre-decode analysis unit 308b and transcode module 306b, each FIFO buffer 402 includes two read ports and two read pointers (one to feed pre-decode analysis units 308 and one to feed transcode modules 306b). Of course the read pointer for pre-analysis (e.g. to read data into a pre-decode analysis unit 308b) does not free up memory since the buffer still holds this data for the transcode processing.

As briefly introduced above, memory controller 604 can be configured to function as switches 504 and 508 of FIG. 5 (here represented by logical switch modules 504a and 508a). The switches are logical in the sense that connections are defined by the use of memory addresses rather than physical connections.

Similarly, memory controller 606 may maintain the memory allocated to each output FIFO buffer 516 in an allocation table 612. A FIFO pointer table 614 may maintain memory address information about each of the output FIFO buffers 516. Furthermore, memory controller 606 can be configured to function as the switch 512 of FIG. 5 (here represented by logical switch 512a).

In addition to the benefits of sharing physical memory modules 602, the disclosed dynamic memory scheme has further advantages with respect to the reduced number of memory interfaces in comparison to embodiments using separate physical buffers for each stream. For example, an embodiment using separate physical FIFO buffers use input and output interfaces for each FIFO buffer. In contrast, physical memory 602 can have one common read-write interface for all logical FIFO units 402b and/or 326b. The common interface is, however, at the expense of a higher bandwidth for this read/write port.

With respect to the number of physical memory modules 602, a single common block can be more efficient. For example, in practice, subdividing the physical memory into smaller blocks can cause an increasing loss of usable memory. This is because of the difficulties in sharing memory between multiple physical blocks. However, for practical reasons, a subdivision into more than one module may be chosen, and a trade-off can be made between what is practical and what is most efficient.

Like the processing units, the access to the physical memory modules 602 are timeshared among the pre-decode analysis and transcoder modules. The multi-port access to the memory from such transcoding and analysis modules can be translated into the single port memory interface through the memory controllers 604 and 606. Thus, the number of interfaces to the memory controller is determined by the number of attached pre-decode analysis and transcoder modules.

Thus, it should be understood that the processing time for each portion of the multimedia stream, as well as the memory requirements needed, will vary depending on a number of factors such as the bit-rate of the input video stream. Using the disclosed embodiments, the memory and/or processing resources of the transcoder are advantageously timeshared. Specifically, the physical memory 602, the pre-decode analysis modules 308b, and/or the transcoder modules 306, can all be timeshared to reduce the hardware and memory requirements for processing a large number of multimedia streams.

Accordingly, many varieties of multimedia channels can be processed efficiently. Whether there are a large number of low-bit rate channels, a few high bit-rate channels, or a mix of channels having a variety of bit rates, no reconfiguration of the hardware is necessary. The capability of the chosen design of the disclosed transcoders to process a desired number of channels depends more on the aggregate bit rate at the input, rather than the specific configuration (i.e. performance or size) of the individual buffers, pre-decode analysis modules, or transcoder modules.

Among other advantages, transcoder systems and methods have been disclosed that can be advantageously scaled to process a large number of multimedia streams without excessive memory requirements and/or duplicative or underutilized hardware. It should be emphasized that many variations and modifications may be made to the above-described embodiments. All such modifications and variations are intended to be included herein within the scope of this disclosure and protected by the following claims.

The invention claimed is:

1. A data processing system comprising:
a first buffer for temporarily maintaining a portion of a plurality of compressed data streams, each portion comprising one or more units of an encoded media signal; and
a switch for providing selective connectivity between the buffer and one or more processors configured to change a property of the data stream, wherein the ratio of processors available to compressed data streams is determined based on network environment conditions, the switch configured to direct one or more units from the buffer to the one or more processors at a time when at least one of the one or more processors is able to process additional data, wherein the one or more processors process a single unit of the one or more units of the encoded media signal, prior to processing another unit of a different channel of the encoded media signal, wherein when there are two or more units ready to be processed at the same time, a system overload is indicated and the one or more processors begin skipping at least one of the two or more units ready to be processed.

2. The system of claim 1, wherein the one or more processors comprise:
a decoder configured to convert at least one of the units received from the buffer into an intermediate format; and
an encoder to convert the at least one unit in the intermediate format into a portion of a target data stream.

3. The system of claim 2, wherein the one or more processors further comprise:
a requantization element configured to change the bit rate of the at least one unit in the intermediate format before re-encoding the at least one unit into the target data stream.

4. The system of claim 1, wherein the one or more processors comprise:
a processing element configured to change the bit rate of at least one of the plurality of compressed data streams.

5. The system of claim 1, further comprising a controller configured to direct the operation of the one or more processors.

6. The system of claim 5, wherein the controller is further configured to direct the one or more processors to change the property of the bit stream based on statistical data of the bit stream.

7. The system of claim 1, wherein the first buffer is logically configured to comprise a plurality of first-in-first-out (FIFO) buffers, each for temporarily maintaining a portion of a respective one of the plurality of compressed data streams, and the switch is configured to provide selective connectivity between each of the plurality of FIFO buffers and each of the one or more processors.

8. The system of claim 7, wherein the number of memory blocks allocated to the plurality of FIFO buffers is dynamically changed based on the size of the respective data stored therein.

9. The system of claim 8, wherein the switch is a memory controller configured to provide the selective connectivity between the plurality of FIFO buffers and the one or more processors.

10. The system of claim 9, wherein the memory controller further includes an allocation table and a pointer table for managing dynamic allocation of the memory blocks.

11. The system of claim 1, wherein the one or more processors convert the portion of the compressed data stream into a portion of a target data stream, and the system further comprises:
a second buffer for receiving and temporarily maintaining the portion of the target data stream from the one or more processors; and
a second switch for providing selective connectivity between the one or more processors and the second buffer.

12. The system of claim 11, wherein the second buffer is logically configured to comprise a plurality of first-in-first-out (FIFO) buffers, each for temporarily maintaining the portion of the target data stream, and the second switch is configured to provide selective connectivity between each of the one or more processors and each of the plurality of FIFO buffers of the second buffer.

13. The system of claim 12, wherein the number of memory blocks allocated to the plurality of FIFO buffers of the second buffer is dynamically changed based on the size of the respective data stored therein.

14. The system of claim 12, wherein the second switch is a memory controller configured to provide the selective connectivity between the one or more processors and the plurality of FIFO buffers of the second buffer.

15. A method for data processing comprising:
temporarily maintaining a portion of a plurality of compressed data streams in a buffer, each portion comprising one or more units of an encoded media signal; and
providing a switch, the switch providing selective connectivity between the buffer and one or more processors configured to change a property of the data stream, wherein the ratio of processors available to compressed data streams is determined based on network environment conditions, the switch configured to direct one or more units from the buffer to the one or more processors at a time when at least one of the one or more processors is able to process additional data, wherein the one or more processors process a single unit of the one or more units of the encoded media signal, prior to processing another unit of a different channel of the encoded media signal, wherein when there are two or more units ready to be processed at the same time, a system overload is indicated and the one or more processors begins skipping at least one of the two or more units ready to be processed.

16. The method of claim 15, further comprising:
changing the bit rate of at least one of the plurality of compressed data streams.

17. The method of claim 15, further comprising:
directing the one or more processors to change the property of the bit stream based on statistical data of the bit stream.

18. The method of claim 15, further comprising:
temporarily maintaining a portion of a respective one of the plurality of compressed data streams in a plurality of first-in-first-out (FIFO) buffers that are logically arranged in the first buffer; and
providing selective connectivity between each of the plurality of FIFO buffers and each of the one or more processors.

19. The method of claim 18, further comprising dynamically changing the number of memory blocks allocated to the plurality of FIFO buffers based on the size of the respective data stored therein.

20. The method of claim 18, further comprising dynamically allocating memory blocks to the plurality of FIFO buffers by maintaining an allocation table and a pointer table.

21. The method of claim 15, wherein the portion of the compressed data stream is converted into a portion of a target data stream by the one or more processors, and the method further comprises:
receiving and temporarily maintaining the portion of the target data stream from the one or more processors in a second buffer; and
providing selective connectivity between the one or more processors and the second buffer.

22. A non-transitory computer-readable medium having a computer program for processing data comprising:
logic configured to temporarily maintain a portion of a plurality of compressed data streams in a buffer, each portion comprising one or more units of an encoded media signal; and logic configured to provide a switch, the switch providing selective connectivity between the buffer and one or more processors configured to change a property of the data stream, wherein the ratio of processors available to compressed data streams is determined based on network environment conditions, the switch configured to direct one or more units from the buffer to the one or more processors at a time when at least one of the one or more processors is able to process additional data, wherein the one or more processors process a single unit of the one or more units of the encoded media signal, prior to processing another unit of a different channel of the encoded media signal, wherein when there are two or more units ready to be processed at the same time, a system overload is indicated and the one or more processors begins skipping at least one of the two or more units ready to be processed.

23. The non-transitory computer-readable medium of claim 22, further comprising:

logic configured to change the bit rate of at least one of the plurality of compressed data streams.

24. The non-transitory computer-readable medium of claim 22, further comprising:

logic configured to direct the one or more processors to change the property of the bit stream based on statistical data of the bit stream.

25. The non-transitory computer-readable medium of claim 22, further comprising:

logic configured to temporarily maintain a portion of a respective one of the plurality of compressed data streams in a plurality of first-in-first-out (FIFO) buffers that are logically arranged in the first buffer; and logic configured to provide selective connectivity between each of the plurality of FIFO buffers and each of the one or more processors.

26. The non-transitory computer-readable medium of claim 25, further comprising logic configured to dynamically change the number of memory blocks allocated to the plurality of FIFO buffers based on the size of the respective data stored therein.

27. The non-transitory computer-readable medium of claim 25, further comprising logic configured to dynamically allocate memory blocks to the plurality of FIFO buffers by maintaining an allocation table and a pointer table.

28. The non-transitory computer-readable medium of claim 22, wherein the portion of the compressed data stream is converted into a portion of a target data stream by the one or more processors, and the computer-readable medium further comprises:

logic configured to receive and temporarily maintaining the portion of the target data stream from the one or more processors in a second buffer; and logic configured to provide selective connectivity between the one or more processors and the second buffer.

* * * * *